J. J. HIGGINBOTTOM.
SPEED CHANGING AND STOPPING MECHANISM FOR KNITTING MACHINES.
APPLICATION FILED MAY 15, 1914.
1,193,263.
Patented Aug. 1, 1916.
4 SHEETS—SHEET 4.
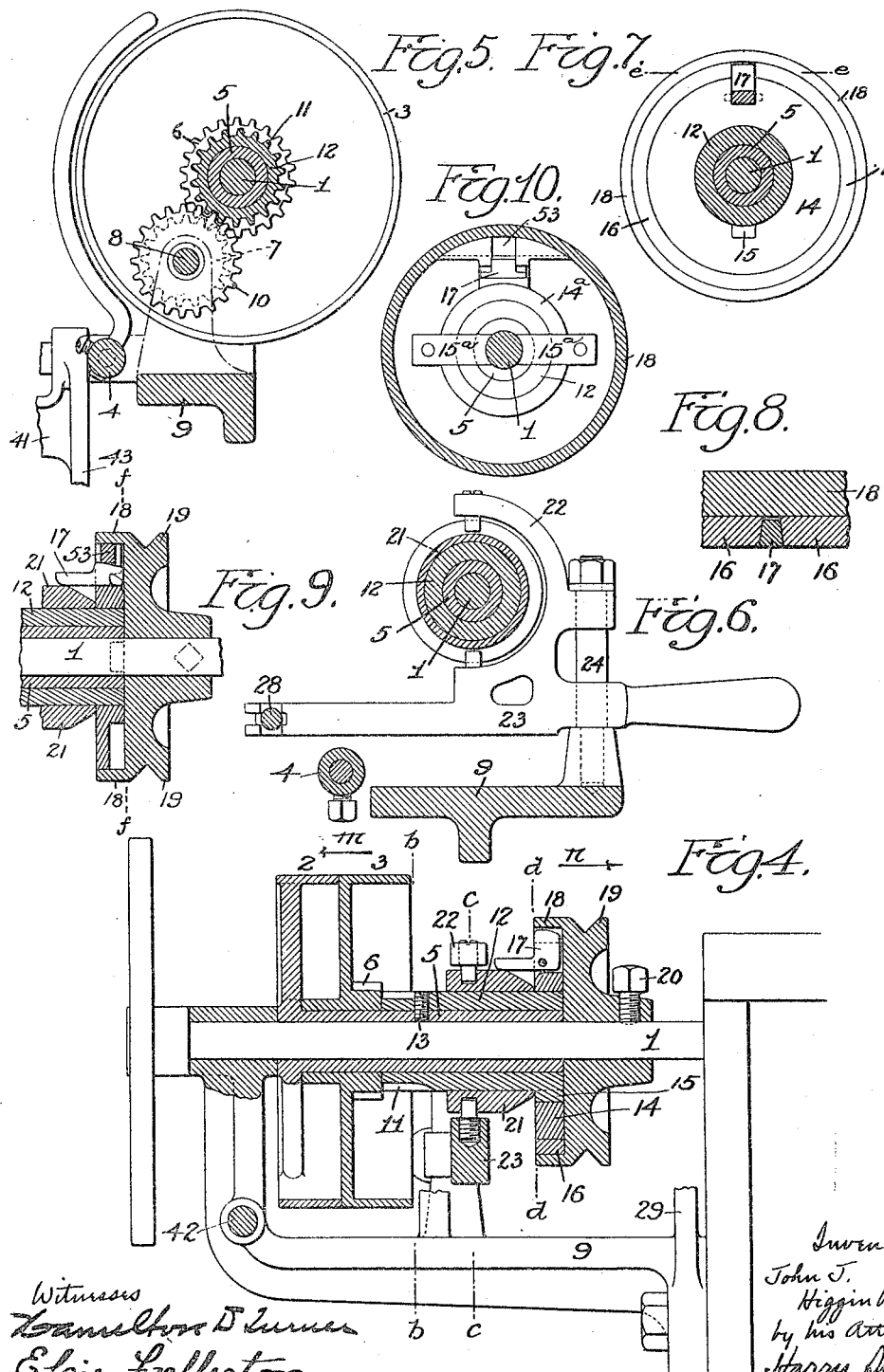

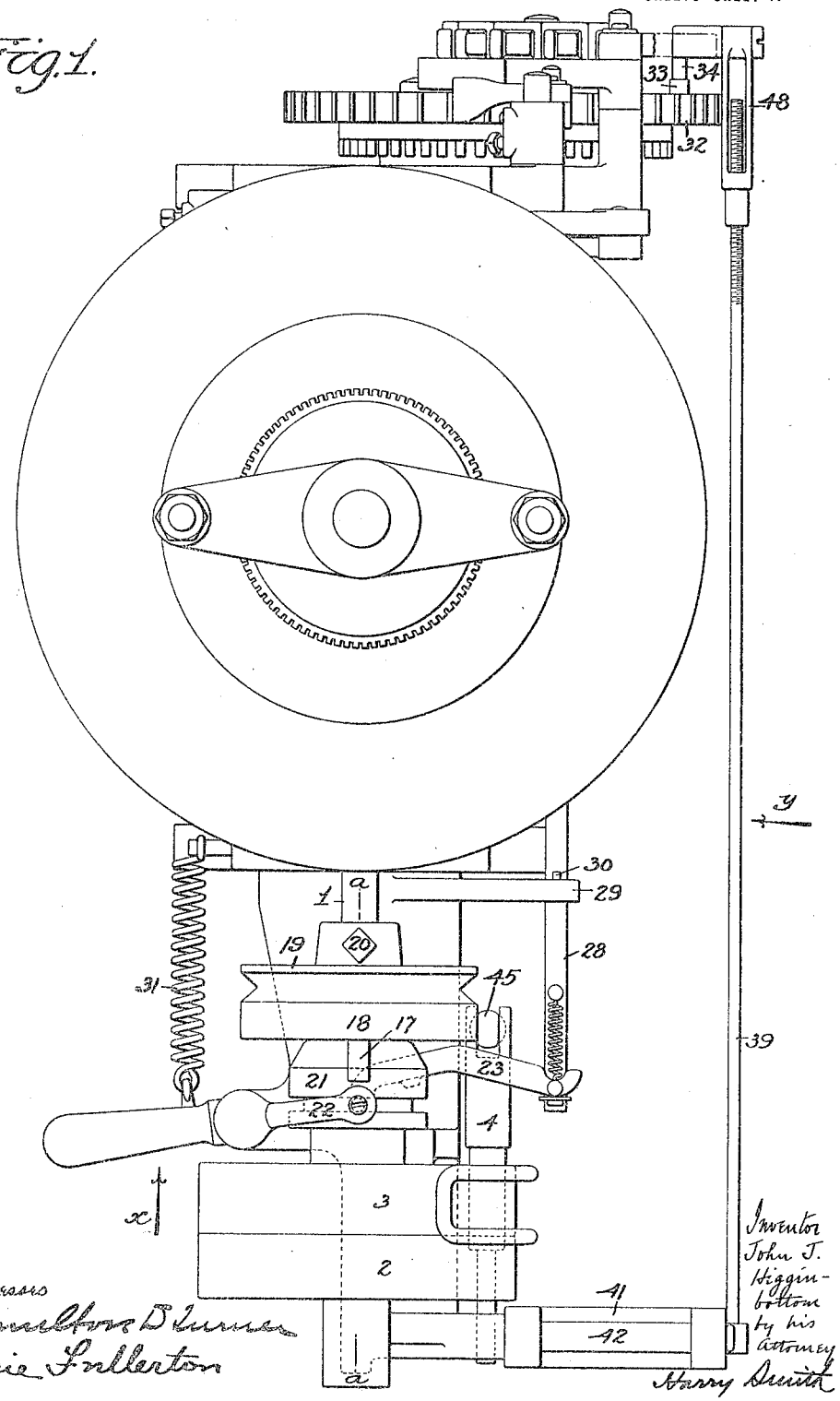

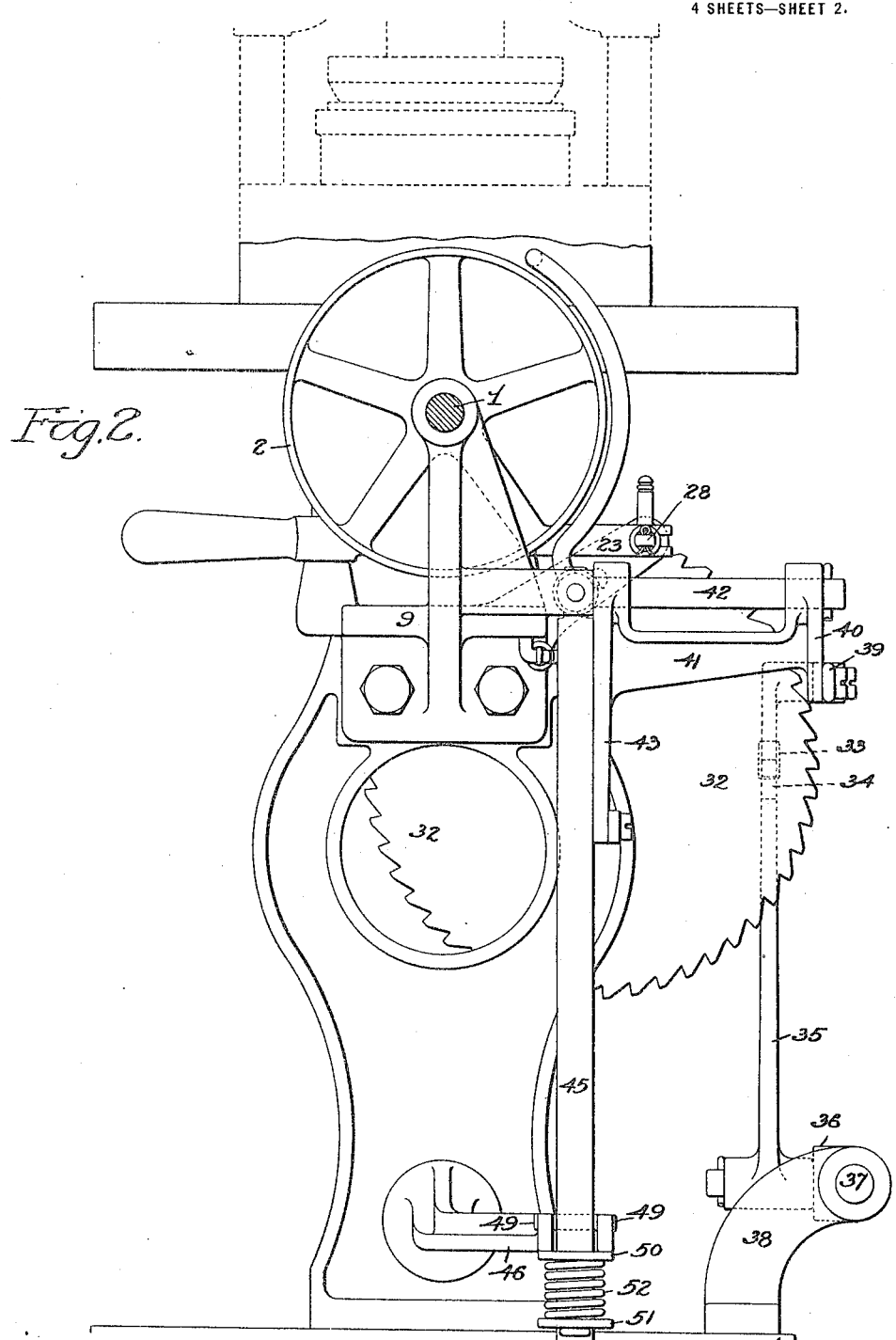

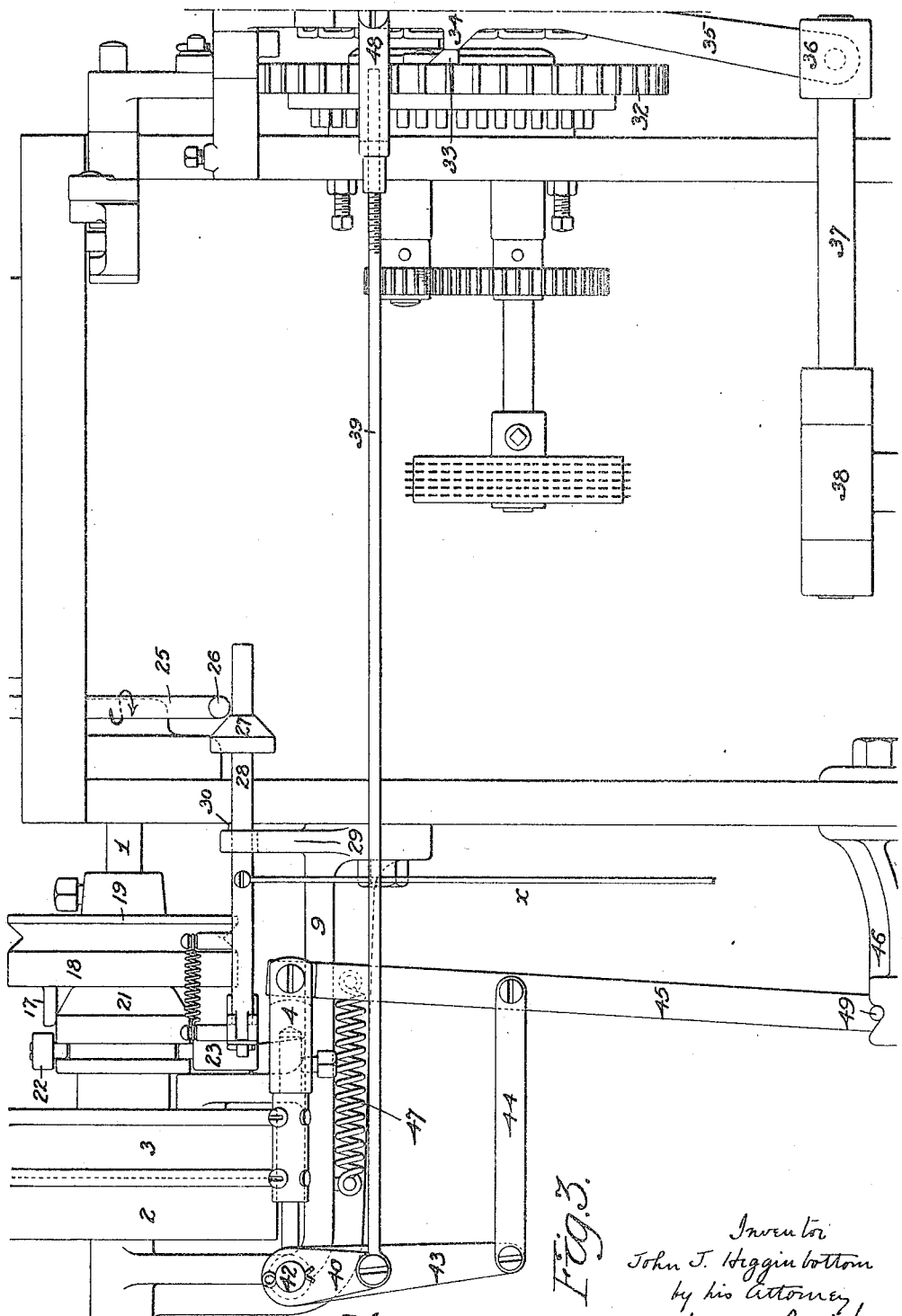

UNITED STATES PATENT OFFICE.

JOHN J. HIGGINBOTTOM, OF PHILADELPHIA, PENNSYLVANIA.

SPEED-CHANGING AND STOPPING MECHANISM FOR KNITTING-MACHINES.

1,193,263. Specification of Letters Patent. Patented Aug. 1, 1916.

Application filed May 15, 1914. Serial No. 838,669.

*To all whom it may concern:*

Be it known that I, JOHN J. HIGGINBOTTOM, a citizen of the United States, residing in Philadelphia, Pennsylvania, have invented certain Improvements in Speed-Changing and Stopping Mechanism for Knitting-Machines, of which the following is a specification.

The object of my invention is to provide efficient mechanism for automatically changing the speed of movement of the machine at predetermined times, and for automatically stopping the operation of the machine in case of emergency.

This object I attain in the manner hereinafter set forth, reference being had to the accompanying drawings, in which—

Figure 1 is a plan or top view of a well-known type of knitting machine equipped with mechanism in accordance with my invention for changing the speed of operation of the same or for arresting such operation in case of emergency; Fig. 2 is an end view of the machine looking in the direction of the arrow $x$ Fig. 1; Fig. 3 is a side view of the machine looking in the direction of the arrow $y$ Fig. 1; Fig. 4 is a longitudinal section on the line $a$—$a$, Fig. 1; Fig. 5 is a transverse section on the line $b$—$b$, Fig. 4, looking in the direction of the arrow $m$; Fig. 6 is a view, partly in elevation and partly in transverse section, on the line $c$—$c$, Fig. 4; Fig. 7 is a transverse section on the line $d$—$d$, Fig. 4, looking in the direction of the arrow $n$; Fig. 8 is a section on the line $e$—$e$, Fig. 7; Fig. 9 is a longitudinal sectional view of part of Fig. 4, but illustrating a modified form of clutching device, and Fig. 10 is a transverse section on the line $f$—$f$, Fig. 9.

In the drawings, 1 represents the driving shaft of the machine which has two pulleys 2 and 3, to either of which the driving belt may be applied, said belt being guided by a movable belt shipper 4. The pulley 2 has a long hub 5 mounted so as to be free to rotate on the shaft 1, as shown in Fig. 4, and the hub of the pulley 3 is mounted so as to be free to rotate on the hub 5, as shown in Fig. 4, and has formed upon it spur teeth 6 which mesh with the teeth of a spur pinion 7 shown by dotted lines in Fig. 5, this spur pinion being free to turn on a stud 8 which is secured to an arm of the fixed frame 9, another spur pinion 10 being secured to the pinion 7 and meshing with a spur wheel 11 on a sleeve 12, the latter being mounted upon the hub 5, as shown in Figs. 4 and 5 and being prevented from turning independently of said hub 5 by means of a dowel pin or screw 13, as shown in Fig. 4.

Mounted upon the inner end of the sleeve 12 is a ring 14 which is prevented from turning on said sleeve by means of a spline 15, as shown in Fig. 7, and mounted upon the ring 14 is a split expansion ring 16, as shown in Figs. 4 and 7, the adjoining ends of this split ring being acted upon by a wedge lever 17 (Figs. 4, 7 and 8) so that when expanded thereby the ring 16 will grip the inner face of a flange 18 on a pulley 19, which is secured to the shaft 1 by means of a set screw 20, as shown in Fig. 4.

The wedge lever 17 is acted upon by a tapering sleeve 21 which is free to slide back and forth on the sleeve 12 and is grooved for the reception of pins projecting from a yoke 22 on a lever 23, the latter being pivotally mounted upon a vertical shaft 24 projecting upwardly from the frame of the machine and being operated either by hand or by connection with one of the operative parts in the machine in the manner hereinafter set forth.

Supposing that the clutch ring 16 is in engagement with the flange 18 of the pulley 19 and that the power transmitting belt is applied to the pulley 2, power will be transmitted to the shaft 1 through the medium of the pulley 2, hub 5, sleeve 12, rings 14 and 16, and pulley 19, and the shaft 1 will have the same number of rotations per minute as the pulley 2. If, however, the belt is shifted onto the pulley 3 the power will be transmitted from said pulley through the gear wheels 6, 7, 10 and 11 to the sleeve 12 and thence to the shaft 1 in the same manner as before, and said gear wheels may be of such character as to reduce or increase the speed of rotation of the shaft 1 in respect to that of the pulley 3.

In the present instance the gears are such as to increase the speed hence the pulley 3 constitutes the high speed pulley and the pulley 2 the low speed pulley of the machine, and the shifting of the driving belt from one pulley to the other will increase or reduce the speed at which the shaft 1 and consequently the other rotating members of the machine will be operated, while the retraction of the tapered sleeve 21 will serve to slacken the split ring 16 and thus release the pulley 19 from connection with the ring 14 and thereby stop the machine. Such stoppage may be effected by operating the lever 23 by hand, or it may be effected automatically by action upon the lever 23 of some member of the machine which operates in an emergency, as for instance by the operation of a shaft 25 which may be actuated by the needle protector or automatic knock-off mechanism of the machine, such for instance as that shown in the patent of Scott & Swinglehurst No. 679,641, dated July 30, 1901. This shaft has an outwardly bent lower end 26 which is adapted to act upon a cone collar 27 on an arm 28 pivotally mounted in the outer end of the lever 23, as shown in Fig. 6, and having on its upper side a projecting lug 30, as shown in Fig. 3.

When the lever 23 is in the position shown in Figs. 1 and 3, that is to say in position for causing the sleeve 21 to tighten the clutch and impart power to the shaft 1, the lug 30 is in engagement with the member 29 at the top of the slot therein and serves to retain the parts in the position shown in Figs. 1 and 3, but if the shaft 25 is turned in the direction of the arrow Fig. 3 its bent lower end 26 will engage with the cone surface of the collar 27 and will depress the free end of the arm 28 until its lug 30 is free from engagement with the member 29, whereupon a spring 31 acting upon the lever 23 will cause such movement of the latter as to withdraw the tapering sleeve from engagement with the wedge lever 17 so as to permit the split ring 16 to contract and thereby free it from engagement with the inner face of the flange 18 of the pulley 19, thereby freeing the latter from the ring 14 and stopping the operation of the machine.

A wire $x$ or other suitable device is intended to connect the arm 28 to the take-up mechanism of the machine so that in the event of any sudden drop of the latter such, for instance, as might be caused by web running off the needles of the machine the arm 28 will be automatically released from engagement with the member 29 and the operation of the machine will be stopped.

Change in the speed of rotation of the machine is automatically effected at the proper intervals in the orderly operation of the machine by means shown in Figs. 1, 2 and 3, and which I will now describe.

A wheel 32, which I call a speed changing wheel, is during the operation of the machine intermittently rotated by mechanism common to machines of this type and which it is not necessary for me to describe as it constitutes no part of my invention, it being sufficient for the purpose of this description to say that this wheel has upon its face a beveled lug 33 which, just before the machine commences to run at high speed, engages with a beveled lug 34 on an arm 35 pivoted to a collar 36 on a rod 37 carried by a bracket 38 on the fixed frame of the machine, the upper end of the arm 35 being pivotally connected to one end of a rod 39, whose other end is connected to one arm 40 of a frame 41 mounted so as to be free to swing upon a stud shaft 42 projecting from a fixed member of the frame, said swinging frame 41 having another arm 43 which is connected by a link 44 to an arm 45 pivotally mounted at its lower end in a bracket 46 on the fixed frame and pivotally connected at its upper end to the belt shipper 4. When, therefore, the lug 33 of the wheel 32 acts upon the lug 34 of the arm 35 the belt shipper is moved so as to shift the belt from the pulley 2 onto the pulley 3, as shown in Figs. 1 and 3, against the tension of a coiled spring 47, but when in the further operation of the wheel 32 the lug 33 is carried out of engagement with the lug 34 of the arm 35 the parts are, under the action of said spring 47, shifted so as to move the belt from the pulley 3 to the pulley 2.

The rod 39 has threaded connection with a head 48 whereby it is connected to the arm 35 so that said rod may be readily lengthened or shortened in order to provide for accurate adjustment of the belt shipper 4.

The bracket 46 on the frame of the machine has in its upper face notches for the reception of the pivot pins 49 which project from opposite sides of the arm 45 and said bracket is, as shown in Fig. 2, slotted for the passage of the arm which, below the bracket, is provided with a pair of washers 50 and 51 and an interposed spring 52, whereby downward pressure is imparted to the arm so as to normally maintain its pivot lugs 49 in the notches of the bracket, the spring, however, permitting movement of the arm sufficient to release the pivot pins from said notches whenever it is desired to unship the lever.

Instead of using a dowel pin 13 and a spline 15, as shown in Fig. 4, as a means of preventing independent rotary movement of the hub 5, sleeve 12 and ring 14, I sometimes find it preferable to use one or more keys 15$^a$ secured to the back of the ring 14, and engaging slots in the hub 5, sleeve 12, and hub 14$^a$ of the ring, as shown in Fig. 10, and instead of employing the split ring 16 as a means of clutching the ring 14 to the pulley 19, it is sometimes preferable to use a segmental shoe 53, as shown in Figs. 9 and 10, this shoe being projected so as to bear against the inner face of the flange 18, when the lever 17 is raised by the tapered sleeve 21, and being freed from contact with said flange 18 when the sleeve 21 is retracted, the shoe providing for a quicker and surer release of the pulley 19 than does the split ring 16.

I claim:

The combination of the driving shaft of a knitting machine, a driving disk secured thereto, a belt pulley having an elongated hub turning loosely on said shaft, another belt pulley turning loosely on said hub, a sleeve secured to said hub, gearing for driving said sleeve from said second belt pulley at a rate of speed different from that of the first pulley, a friction clutch interposed between said sleeve and the driving disk, means for shifting the driving belt from one of said pulleys to the other, and means independent thereof for rendering said friction clutch operative or inoperative.

In testimony whereof, I have signed my name to this specification, in the presence of two subscribing witnesses.

JOHN J. HIGGINBOTTOM.

Witnesses:
FRANK L. STRUEBING,
H. H. SINNAMON.